United States Patent
Kosov

(10) Patent No.: US 10,215,248 B2
(45) Date of Patent: Feb. 26, 2019

(54) SUPPORT FOR A DRIVER'S CAB OF A VEHICLE

(71) Applicant: ContiTech Vibration Control GmbH, Hannover (DE)

(72) Inventor: Oleksandr Kosov, Langenhagen (DE)

(73) Assignee: ContiTech Vibration Control GmbH, Hannover (DE)

( * ) Notice: Subject to any disclaimer, the term of this patent is extended or adjusted under 35 U.S.C. 154(b) by 5 days.

(21) Appl. No.: 15/514,066

(22) PCT Filed: Jul. 14, 2015

(86) PCT No.: PCT/EP2015/066008
§ 371 (c)(1),
(2) Date: Mar. 24, 2017

(87) PCT Pub. No.: WO2016/055174
PCT Pub. Date: Apr. 14, 2016

(65) Prior Publication Data
US 2017/0241499 A1 Aug. 24, 2017

(30) Foreign Application Priority Data

Oct. 7, 2014 (DE) .................. 10 2014 220 291

(51) Int. Cl.
*F16F 1/38* (2006.01)
*B62D 33/06* (2006.01)
(Continued)

(52) U.S. Cl.
CPC ............ *F16F 1/38* (2013.01); *B62D 33/0604* (2013.01); *F16F 1/3732* (2013.01);
(Continued)

(58) Field of Classification Search
CPC .......... F16F 1/38; F16F 1/3828; F16F 1/3849; F16F 1/3835; F16F 1/376; F16F 3/0873;
(Continued)

(56) References Cited

U.S. PATENT DOCUMENTS 2,869,811 A * 1/1959 Boschi ................. F16F 1/3732
267/141.4
4,210,362 A 7/1980 Boersma
(Continued)

FOREIGN PATENT DOCUMENTS

CN 100999233 A 7/2007
DE 69617624 T2 10/2002
(Continued)

OTHER PUBLICATIONS

DE Search Report dated Aug. 3, 2017 of DE 10 2014 220 291.4 on which this application is based.

*Primary Examiner* — Robert A. Siconolfi
*Assistant Examiner* — San M Aung
(74) *Attorney, Agent, or Firm* — David L. Cate

(57) ABSTRACT

The present invention relates to a bearing arrangement for a driver's cab (12) of a vehicle, which bearing arrangement is, in a mounted state, arranged between the driver's cab (12) and a cab support (16) of the vehicle, having a cone bearing (14) which, centrally, has a bearing sleeve (34) which is fixable to the driver's cab (12) and which extends through an opening (38) of the cab support (16) and which is of hollow form, wherein the bearing sleeve (34) is, at the outside, by way of an elastic damping element (22) connected thereto, connected to a concentrically arranged support element (24), wherein the support element (24) is fixable to the cab support (16) at the cab side by way of connecting elements (26), and having an abutment element (30) which is arranged on an end, averted from the driver's cab (12), of the bearing sleeve (34) and which serves for limiting a movement of the
(Continued)

damping element (22) in an axial direction (A). The bearing arrangement is characterized in that an installation element (30) is arranged on a side, facing toward the abutment element (30), of the cab support (16), which installation element is, by way of the connecting elements (26), fastened to the cab support (16) concentrically with respect to the bearing sleeve (34).

15 Claims, 2 Drawing Sheets

(51) Int. Cl.
   *F16F 1/373* (2006.01)
   *F16F 1/393* (2006.01)
(52) U.S. Cl.
   CPC .......... *F16F 1/3828* (2013.01); *F16F 1/3849* (2013.01); *F16F 1/3935* (2013.01)
(58) Field of Classification Search
   CPC .............. F16F 2230/02; F16F 2230/14; B62D 33/0604
   USPC .......... 267/141.7, 140.11, 141.4, 141.5, 182; 180/89.12; 248/561, 562, 610, 611, 612, 248/634, 635, 638
   See application file for complete search history.

(56) References Cited

U.S. PATENT DOCUMENTS

| | | | |
|---|---|---|---|
| 4,440,437 A * | 4/1984 | Hahm | ................... B62D 33/067 180/89.13 |
| 5,242,146 A * | 9/1993 | Tecco | .................... F16F 1/3935 248/636 |
| 5,498,060 A | 3/1996 | Satomi | |
| 5,516,176 A | 5/1996 | Kimoto et al. | |
| 5,984,036 A * | 11/1999 | Higuchi | ................... E02F 9/166 180/89.12 |
| 6,017,073 A | 1/2000 | Lindblom et al. | |
| 6,474,430 B2 | 11/2002 | Hamaekers et al. | |
| 2006/0261640 A1 | 11/2006 | Mori et al. | |
| 2007/0214685 A1 | 9/2007 | Lou | |
| 2010/0320359 A1* | 12/2010 | Visage | ................... F16F 1/3828 248/638 |

FOREIGN PATENT DOCUMENTS

| | | |
|---|---|---|
| DE | 60004277 T2 | 6/2004 |
| EP | 429084 A1 | 5/1991 |
| JP | 6016152 A | 1/1994 |
| JP | 2010230038 A | 10/2010 |

* cited by examiner

SUPPORT FOR A DRIVER'S CAB OF A VEHICLE

The invention relates to a bearing arrangement for a driver's cab of a vehicle.

Modern construction vehicles, agricultural vehicles and/or heavy goods vehicles predominantly have closed driver's cabs which are for example mounted on and fixed to cab supports of the vehicle. Here, the driver's cabs are normally mounted on rubber bearings for the damping of vibrations. The closed driver's cabs increase safety for an operator of the vehicle, and protect the operator from weather influences, and reduce the influence of external noise sources. Here, the rubber bearings that are used are normally arranged between a floor of the driver's cab and the cab supports, wherein the cab may for example be connected in each case by way of a cab bolt to a rubber bearing.

DE 39 38 962 A1 has disclosed an elastic bearing arrangement for the driver's cab of an agricultural or construction vehicle, which elastic bearing arrangement is inserted between the driver's cab and the vehicle body or the chassis and has a damping element. As a damping element, a disk-shaped isolator is provided which is equipped with metal enclosures, the bushing and the fastening plate. By way of the elastic rubber bearing, it is possible to realize, for the driver's cab, a bearing arrangement which is soft over wide ranges and which has a progressive characteristic curve profile of the bearing arrangement. A disadvantage here is however the cumbersome installation of the rubber bearing on the chassis by way of a multiplicity of countersunk-head screws. Furthermore, a tensile load acting on the driver's cab and thus on the bearing arrangement can lead to damage to the rubber bearing.

Furthermore, it is necessary, in the case of vehicles such as construction machines and agricultural vehicles, to satisfy certain safety standards. Here, for example in the event of overturning or rolling-over of the vehicle, the driver's cab must be rigid enough in order that the operator of the vehicle is protected, and equally, the driver's cab must not be broken away from the vehicle during such an accident.

It is therefore the object of the present invention to provide a breakaway-proof bearing arrangement for a driver's cab of a vehicle, which permits facilitated installation and which prevents damage to the bearing arrangement in the event of a tensile force acting on the bearing arrangement.

The object is achieved by way of the features of claim 1. Further advantageous refinements of the invention are presented in the subclaims.

The present invention thus relates to a breakaway-proof bearing arrangement for a driver's cab of a vehicle, which bearing arrangement is, in a mounted state, arranged between the driver's cab and a cab support of the vehicle, having a cone bearing which, centrally, has a bearing sleeve which is fixable to the driver's cab and which extends through an opening of the cab support and which is of hollow form, wherein the bearing sleeve is, at the outside, by way of an elastic damping element connected thereto, connected to a concentrically arranged support element, wherein the support element is fixable to the cab support at the cab side by way of connecting elements, and having an abutment element which is arranged on an end, averted from the driver's cab, of the bearing sleeve and which serves for limiting a movement of the damping element in an axial direction. According to the invention, an installation element is arranged on a side, facing toward the abutment element, of the cab support, which installation element is, by way of the connecting elements, fastened to the cab support concentrically with respect to the bearing sleeve.

Normally, to accommodate a driver's cab, a vehicle has a multiplicity of cab supports on which there is arranged in each case one bearing arrangement onto which the driver's cab can be placed and connected thereto. For this purpose, the bearing arrangement has in each case one cone bearing which can be connected to the cab support by way of connecting elements, for example screws. Here, the cab supports each have an opening into which the cone bearing at least partially extends in an installed state, for example for the purposes of reducing the structural height of the bearing arrangement for the driver's cab. The cone bearing has, on the outside, for the connection to the cab support, a support element, wherein the support element may be at least partially of conical form and may be formed so as to be substantially rotationally symmetrical around a longitudinal axis of the cone bearing. For the fixing of the support element to the cab support, the support element may have, radially at the outside, one or more bores for receiving connecting elements. The support element is connected by way of an elastic damping element which is of substantially conical form, and which is for example composed of rubber, to a bearing sleeve which is arranged centrally coaxially with respect to the longitudinal axis and which is at least partially of conical form. The bearing sleeve serves for accommodating and accommodating the driver's cab and is in particular at least partially of conical form at the driver's cab side. The bearing sleeve extends from the driver's cab through the opening in the cab support. The elastic damping element arranged between the bearing sleeve, which is connected to the driver's cab, and the support element, which is connected to the cab support of the vehicle, permits a movement of the driver's cab relative to the cab support substantially in an axial direction along the longitudinal axis of the cone bearing, whereby occurring oscillations and vibrations of the vehicle can be dampened and decoupled from the driver's cab.

Movement of the driver's cab and of the bearing sleeve in an axial direction, in particular in the event of tensile forces acting on the bearing arrangement, can be limited by way of an abutment element which is arranged on an end, averted from the driver's cab, of the bearing sleeve. By way of the abutment element, it is also possible for a breakaway or detachment of the driver's cab from the cab support to be prevented, because the abutment element does not pass through the opening in the cab support. Here, the abutment element may be of disk-shaped form and fastenable to the bearing sleeve by way of a cab bolt for the fastening of the driver's cab. To limit the movement of the abutment element and of the bearing sleeve in an axial direction, an installation element is arranged on a side, facing toward the abutment element, of the cab support, which installation element is, by way of the connecting elements, fastened to the cab support concentrically with respect to the bearing sleeve. Here, the connecting elements may fix in each case the support element and the installation element to the cab support. Here, the connecting elements are arranged in each case in a bore which extends through the support element, the cab support and the installation element. The installation element has an opening through which the cone bearing can at least partially project, wherein the installation element is arranged, concentrically with respect to the cone bearing, on the cab support. The installation element may be of disk-shaped and/or ring-shaped form, and in an installed state, is fixed to the cab support by way of the connecting elements by way of which the cone bearing, in particular the support element, is fastened to the cab support. Here, the installation element is arranged on and fastened to the cab support so as to be situated opposite the support element, such that, along a connecting element, the cab support is arranged between the support element and the installation element.

The abutment element is designed to be larger in a radial direction than the opening in the installation element, such that an overlap is formed between the abutment element and the installation element in a radial direction. By way of said overlap, a breakaway of the bearing in the event of an overload by tensile forces can be prevented, because the tensile forces can be dissipated via the abutment element and the installation element. By way of an adjustable spacing between the abutment element and the installation element, the relative movement of the driver's cab and of the bearing sleeve in an axial direction is limited in an adjustable manner. The elastic damping element can in this case be deflected in an axial direction until the abutment element comes into contact with the installation element. The spacing between the abutment element and the installation element may in this case be selected such that damage to the elastic damping element is prevented. It is advantageous that, in the event of a further increase of a tensile force in an axial direction, the force flow via the abutment element is conducted through the installation element into the cab support of the vehicle, whereby larger dimensioning and a stronger design in particular of the support element can be avoided, because only a defined tensile force, which is dependent on the deformation of the elastic damping element, is transmitted to the cab support via the support element. By way of the fastening of the installation element to the cab support by way of the same connecting elements as those by which the support element of the cone bearing is connected to the cab support, the installation process can furthermore be simplified.

In an advantageous refinement of the invention, the installation element is supported, within the opening of the cab support, on the support element. The support element may have a region which is of conical form and which extends at least partially within the opening in the cab support. The installation element may have a correspondingly designed conical region arranged radially at the inside, which region, in an installed state of the installation element, makes contact with the support element, in particular within the opening of the cab support. The contact region between the support element and the installation element, in particular in the region of conical form, may in this case be of substantially linear and/or areal form around the longitudinal axis of the cone bearing. In this way, the support element can be supported, within the opening of the cab support, by the installation element, which has the advantage that, in the event of a compressive load acting on the cone bearing in an axial direction, the forces can be transmitted from the support element at least partially to the installation element and can be conducted via the connecting elements into the cab support. This has the advantage that the support element can be dimensioned to be of lesser strength, whereby costs can be saved. Furthermore, damage to the support element, for example in the event of overloading, can be prevented.

In a further preferred refinement of the invention, the installation element fixed to the cab support is in linear and/or areal contact with the cab support. This has the advantage that, in the case of tensile forces being transmitted via the abutment element to the installation element, the forces that arise can be dissipated over a larger area uniformly into the cab support, whereby instances of punctiform overload and damage to the bearing arrangement can be prevented.

The installation element advantageously has a shoulder which extends at least partially into the opening of the cab support and which serves in particular for making contact, radially at the outside, with the cab support within the opening. The shoulder may extend in an axial direction, in particular toward the driver's cab, into the opening, wherein the shoulder can, in an installed state of the installation element, make contact, radially at the outside, with an inner wall of the opening of the cab support. The shoulder may have, radially at the inside, a conical region which is formed around the longitudinal axis of the cone bearing, which conical region may be designed for making contact with the support element in an installed state. The shoulder for making contact, radially at the outside, with the cab support within the opening of the cab support permits, firstly, centering of the installation element during the installation process, and an improvement in the accommodation of shear forces, which act on the cone bearing and in particular on the support element, and the introduction of said shear forces into the cab support. In this way, it is also possible for the shear forces which act on the connecting elements, and which may act substantially at right angles to the longitudinal axis of the cone bearing, to be reduced.

In a particularly preferred embodiment of the invention, the installation element has at least one bore with an internal thread for interacting with a connecting element. This makes it possible to save on material for the fastening of the connecting elements, because, for example in the case of connecting elements in the form of screws, the external thread thereof can be screwed directly into the internal thread of the installation element, and thus the nuts that are otherwise conventional can be omitted. Furthermore, in this way, the installation of the installation element and of the cone bearing can be simplified.

It is furthermore preferable if, in the event of a displacement of the bearing arrangement in an axial direction, the abutment element and the installation element which interacts therewith are in, in particular, ring-shaped, linear and/or areal contact. An interaction of the abutment element and of the installation element is possible in the event of an axial displacement of the bearing arrangement as a result of acting tensile forces, wherein, owing to the ring-shaped, linear and/or areal contact, the acting tensile forces can be introduced in a particularly uniform manner into the installation element.

In a particularly preferred embodiment of the invention, the bearing sleeve has, at the abutment element side, an external thread, and the abutment element has a corresponding internal thread for interacting with said external thread. In this way, it is possible, during the installation of the bearing arrangement, for the abutment element to be fastened directly to the bearing sleeve, in particular before the driver's cab is fastened by way of a cab bolt to the bearing arrangement. This has the advantage that the abutment element can be installed independently of the cab bolt, and it is not necessary to firstly wait until the cab has been fastened by way of the cab bolt to the bearing arrangement. Here, the internal thread and external thread may be dimensioned so as to merely hold the abutment element on the bearing sleeve for installation purposes. An introduction of tensile forces, for example, into the abutment element remains possible via the installed cab bolt.

In a further embodiment of the invention, the abutment element has a passage bore with an internal thread for screw connection to an external thread of a cab bolt. In this way, the installation of the bearing arrangement of the driver's cab can be further simplified, because the cab bolt can be screwed directly to the abutment element, whereby a direct introduction of force from the cab bolt into the abutment element is also possible. The abutment element may have, in an axial direction, a passage bore of two-stage form, wherein an internal thread may be formed in each stage, for example for the fastening of the abutment element to the bearing sleeve and for the fastening of the cab bolt. In this way, within the passage bore, there may be formed two internal threads with different diameters, which permit installation of the abutment element on the bearing sleeve and fastening of the cab bolt to the abutment element by way of screw connection.

The abutment element advantageously has, at the installation element side, an elastic coating for making contact with the installation element. By way of the elastic coating, damping of the transmission of force between the abutment element and the installation element can be realized. Furthermore, the wear of the abutment element and/or of the installation element in the event of contact can be reduced.

The invention also relates to a vehicle having at least one bearing arrangement, designed and refined as discussed above, for a driver's cab.

An exemplary embodiment and further advantages of the invention will be explained hereunder in conjunction with the following figures, in which: In the figures.

Figure 1:
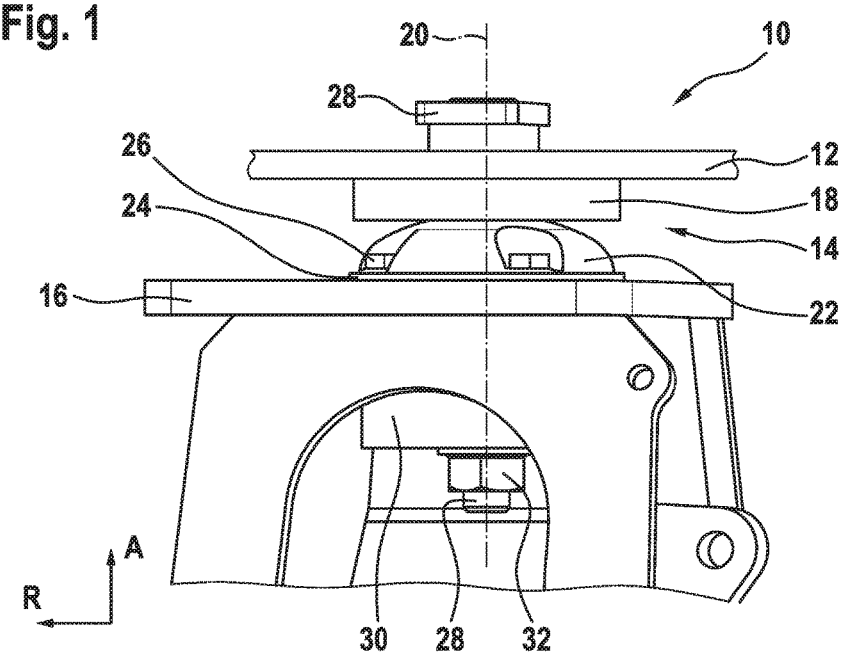
FIG. 1 shows a perspective schematic view of a bearing arrangement according to the invention in an installed state.

FIG. 1 shows a bearing arrangement 10 for a driver's cab 12 of a vehicle. Here, the bearing arrangement 10 has a cone bearing 14 which is arranged between the driver's cab 12 and a cab support 16. For better load distribution, there is arranged between the cone bearing 14 and the driver's cab 12 an intermediate element 18 which is arranged in the form of a disk concentrically with respect to a longitudinal axis 20 of the cone bearing 14. The driver's cab 12 and in particular the intermediate element 18 are connected, at a bearing sleeve (not illustrated), to the cone bearing 14. Here, the bearing sleeve is connected by way of an elastic damping element 22 of conical form to a support element 24. The support element 24 is fastened by way of connecting elements 26 at the driver's cab side in the cab support 16. The driver's cab 12 is connected to the cone bearing 14 by way of a cab bolt 28 which extends through the cone bearing 14 and through the bearing sleeve, which is of hollow form, of said cone bearing. On a side of the cab support 16 averted from the driver's cab 12, an abutment element 30 is arranged on the cone bearing 14 coaxially with respect to the longitudinal axis 20 of the cone bearing 14, and said abutment element is held by way of the cab bolt 28 and by way of a nut 32 which bears against the abutment element 30. In this installed state of the bearing arrangement 10, it is possible for compressive forces, for example the weight of the driver's cab 12, to be introduced via the bearing sleeve, via the elastic damping element 22 and the support element 24 into the cab support 16.

Figure 2:
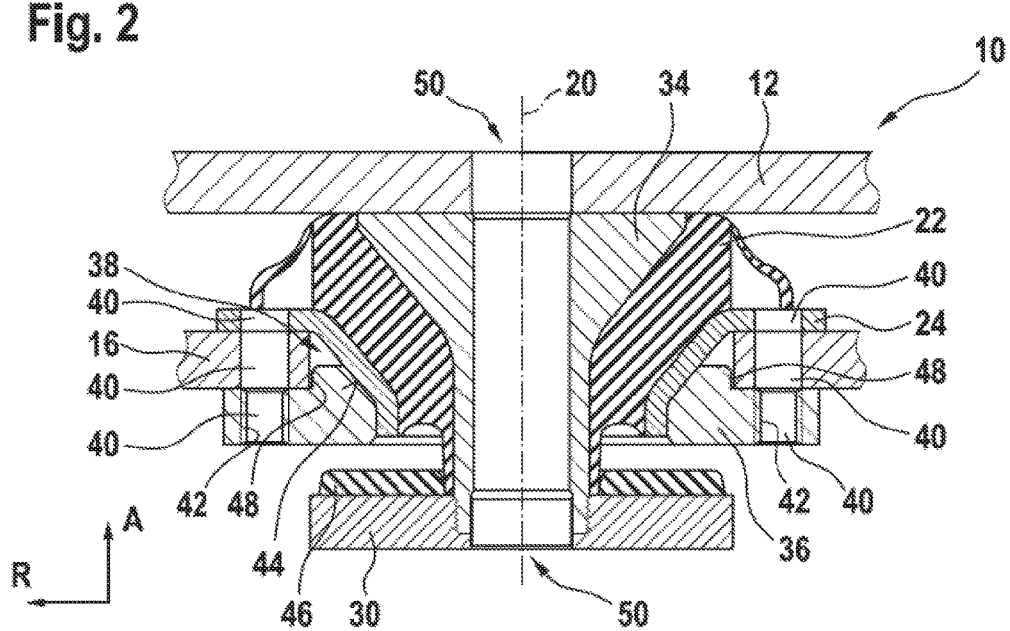
FIG. 2 shows a schematic sectional drawing through a bearing arrangement for a driver's cab.

To prevent damage to the bearing arrangement 10, in particular to the elastic damping element 22, in the event of tensile forces acting in an axial direction A, the relative movement of the hollow bearing sleeve 34 illustrated in FIG. 2 relative to the support element 24 is limited. For this purpose, according to the invention, an installation element 36 is arranged at the abutment element side on the cab support 16. The spacing between the installation element 36 and the abutment element 30 may in this case be set such that, in the event of a deflection of the bearing sleeve 34 and thus of the abutment element 30 in an axial direction A, the abutment element 30 and the installation element 36 come into contact before the elastic damping element 22 is damaged. Here, the abutment element 30 is, by way of the cab bolt 28, connected via the bearing sleeve 34 to the driver's cab 12. Here, the bearing sleeve 34 is of hollow form for the purposes of receiving the bearing bolt 28 and, at the driver's cab side, at least partially has a conical shape. Here, the bearing sleeve 34 extends from the driver's cab 12 through an opening 38 of the cab support. At least in that region of the bearing sleeve 34 which is of conical form, the bearing sleeve 34 is connected to the damping element 22, which likewise has a conical shape and is likewise formed rotationally symmetrically around the longitudinal axis 20 of the cone bearing 14. At the outside, the elastic damping element 22 is connected to the support element 24, wherein the support element 24 has, radially at the inside, a conical region which is arranged at least partially in the opening 38 of the cab support 16.

Radially at the outside, the support element 24 has bores 40 for receiving a connecting element 26. The bore 40 extends through the support element 24, through the cab support 16 and through the installation element 36. The bore 40 has, in the installation element 36, in each case one internal thread 42, whereby a connecting element 26 in the form of a screw can be screwed in each case directly by way of its external thread into the associated internal thread 42 of the installation element 36. In an assembled state of the bearing arrangement 10, a compressive force in an axial direction A, for example the weight of the driver's cab 12, is conducted via the bearing sleeve 34 and the elastic damping element 22 into the support element 24. From the support element 24, the compressive force can be dissipated at least partially into the cab support 16. Within the opening 38 of the cab support 16, the installation element 36 and the support element 24 have a contact surface 44 which is of conical form and which is formed in ring-shaped fashion around the longitudinal axis 20 of the cone bearing 14, and at which the support element 24 is supported by the installation element 36 in an axial and/or radial direction. In this way, it is at least partially possible for compressive forces acting on the support element 24 to be dissipated via the contact surface 44 and the installation element 36 via the connecting elements 26 into the cab support 16.

In the event of bouncing of the vehicle or in the event of an accident, for example in the event of the vehicle rolling over, tensile forces in an axial direction A can arise which could damage the bearing arrangement 10, in particular the elastic damping element 22 of the cone bearing 14. The maximum tensile forces acting on the elastic damping element 22 can however be determined through the setting of the spacing between the abutment element 30 and the installation element 36, such that damage to the elastic damping element 22 can be avoided. In the event of a deflection of the bearing arrangement 10 in an axial direction A, the abutment element 30 can make contact with the installation element 36 owing to acting tensile forces, and can form a ring-shaped contact surface with said installation element around the longitudinal axis 20. The tensile forces introduced into the abutment element 30 via the cab bolt 28 may be dissipated as compressive forces via the installation element 36 into the cab support 16. In this way, even in the event of the vehicle rolling over, a breakaway of the driver's cab 12 can be avoided, because, by way of the installation element 36 and the abutment element 30, a detachment of the connection between the driver's cab 12 and the cab support 16 can be prevented.

To realize additional damping and prevent damage to the abutment element 30 and/or to the installation element 36, an elastic coating 46 is applied to the abutment element 30 on the installation element side. Here, the elastic coating 46 is arranged, rotationally symmetrically around the longitudinal axis 20, areally on the abutment element 30. For example for accommodating shear forces which act on the bearing arrangement 10 non-coaxially with respect to the longitudinal axis 20, the installation element 36 has a shoulder 48 which, in an installed state of the installation element 36, extends in an axial direction into the opening 38 of the cab support 16. The shoulder 48 may bear, radially at the outside, against the cab support 16 within the opening 38. In this way, shear forces which act for example perpendicular to the longitudinal axis 20 in a radial direction R can be transmitted via the bearing sleeve 34 via the elastic damping element 22 to the support element 24, accommodated by the installation element 36 and dissipated into the cab support 16. In this way, shear forces acting on the connecting elements 26, which could lead to failure of the connecting elements 26, can be avoided.

Figure 3:
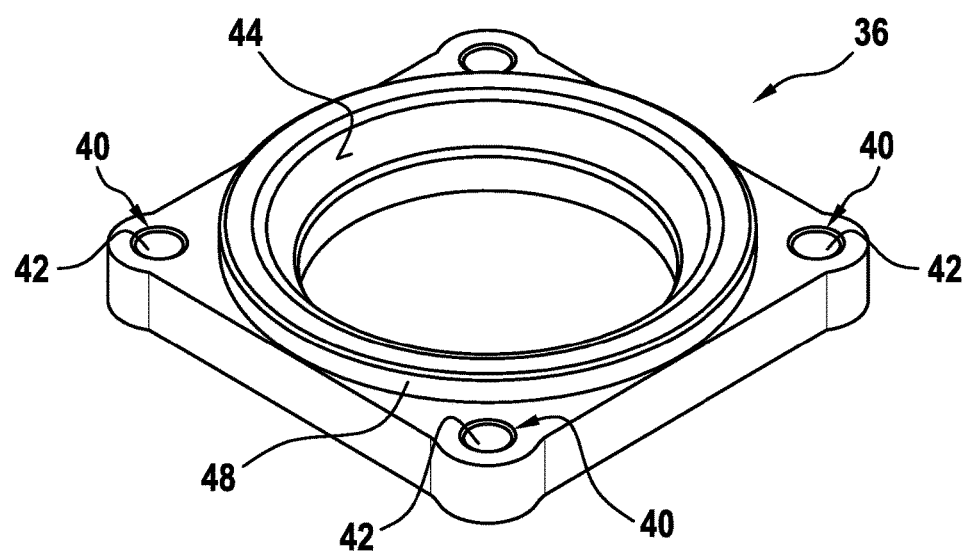
FIG. 3 shows a perspective schematic view of an installation element.
Figure 4:
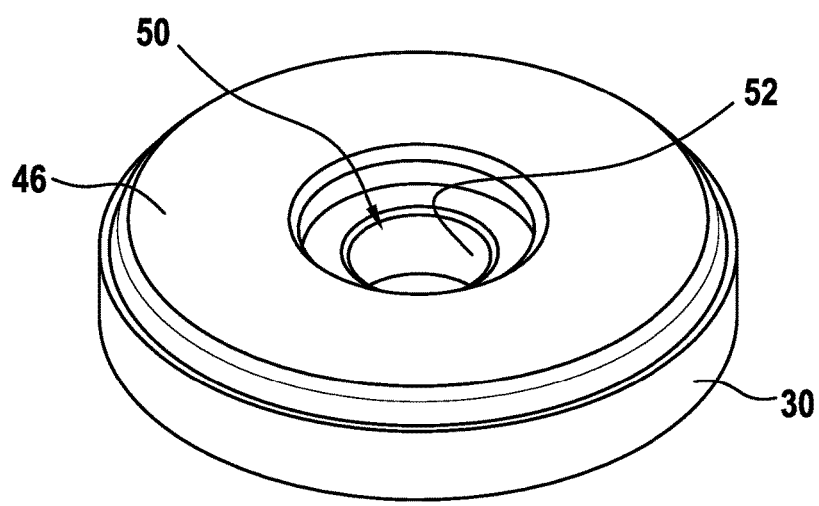
FIG. 4 shows a perspective schematic view of an abutment element.

FIG. 3 illustrates a perspective view of the installation element 36. The installation element 36 has a substantially square outline, wherein, centrally, there is formed a cutout for concentric arrangement on the cone bearing 14 and in particular on the support element 24. For making contact with the support element 24, the installation element 36 has a contact region 44 which is arranged in ring-shaped fashion and which is of conical form. Radially at the outside with respect to the contact region 44, there is formed a shoulder 48 which, in an installed state within the opening 38, can make contact with the cab support 16. For the fastening of the installation element 36 to the cab support 16, the installation element 36 has four bores 40 which each have an internal thread 42 for receiving and interacting with external threads of connecting elements. The abutment element 30 illustrated in FIG. 4 has, on a side facing toward the installation element 36, a concentrically arranged elastic coating 46 of areal form. A centrally arranged passage bore 50 serves for receiving a cab bolt (not illustrated) and may have an internal thread 52 into which the cab bolt can be screwed directly by way of its external thread.

LIST OF REFERENCE SIGNS

Part of the Description

A Axial direction
R Radial direction
10 Bearing arrangement
12 Driver's cab
14 Cone bearing
16 Cab support
18 Intermediate element
20 Longitudinal axis
22 Damping element
24 Support element
26 Connecting element
28 Cab bolt
30 Abutment element
32 Nut
34 Bearing sleeve
36 Installation element
38 Opening
40 Bore
42 Internal thread
44 Contact surface
46 Coating
48 Shoulder
50 Passage bore
52 Internal thread

The invention claimed is:

1. A bearing arrangement for a driver's cab of a vehicle, the bearing arrangement comprising a cone bearing which, centrally, has a bearing sleeve which is fixable to the driver's cab and which extends through an opening of a cab support and which is of hollow form;
   wherein the bearing sleeve is, at the outside, by way of an elastic damping element connected thereto, connected to a concentrically arranged support element;
   wherein the support element is fixable to the cab support at a cab side by way of connecting elements, and wherein the support element comprises an abutment element which is arranged on an end, averted from the driver's cab, of the bearing sleeve and which serves for limiting a movement of the damping element in an axial direction (A);
   wherein an installation element is arranged on a side, facing toward the abutment element, of the cab support, which installation element is, by way of the connecting elements, fastened to the cab support concentrically with respect to the bearing sleeve;
   wherein the bearing arrangement is, in a mounted state, arranged between the driver's cab and a cab support of the vehicle; and,
   wherein the bearing sleeve comprises, at the abutment element side, an external thread, and the abutment element comprises a corresponding internal thread for interacting with said external thread.

2. The bearing arrangement as claimed in claim 1, wherein the installation element is supported, within an opening of the cab support, on the support element.

3. The bearing arrangement as claimed in claim 1, wherein the installation element fixed to the cab support is in linear and/or areal contact with the cab support.

4. The bearing arrangement as claimed in claim 1, wherein the installation element comprises a shoulder which extends at least partially into an opening of the cab support and which serves in particular for making contact, radially at the outside, with the cab support within the opening.

5. The bearing arrangement as claimed in claim 1, wherein the abutment element comprises, at the installation element side, an elastic coating for making contact with the installation element.

6. A bearing arrangement for a driver's cab of a vehicle, the bearing arrangement comprising a cone bearing which, centrally, has a bearing sleeve which is fixable to the driver's cab and which extends through an opening of a cab support and which is of hollow form;
   wherein the bearing sleeve is, at the outside, by way of an elastic damping element connected thereto, connected to a concentrically arranged support element;
   wherein the support element is fixable to the cab support at a cab side by way of connecting elements, and wherein the support element comprises an abutment element which is arranged on an end, averted from the driver's cab, of the bearing sleeve and which serves for limiting a movement of the damping element in an axial direction (A);

wherein an installation element is arranged on a side, facing toward the abutment element, of the cab support, which installation element is, by way of the connecting elements, fastened to the cab support concentrically with respect to the bearing sleeve, and wherein the installation element comprises at least one bore with an internal thread for interacting with a connecting element;

wherein the bearing arrangement is, in a mounted state, arranged between the driver's cab and a cab support of the vehicle; and, wherein the abutment element comprises, at the installation element side, an elastic coating for making contact with the installation element.

7. The bearing arrangement as claimed in claim 6, wherein the installation element is supported, within an opening of the cab support, on the support element.

8. The bearing arrangement as claimed in claim 6, wherein the installation element fixed to the cab support is in linear and/or areal contact with the cab support.

9. The bearing arrangement as claimed in claim 6, wherein the installation element comprises a shoulder which extends at least partially into an opening of the cab support and which serves in particular for making contact, radially at the outside, with the cab support within the opening.

10. The bearing arrangement as claimed in claim 6, wherein the bearing sleeve comprises, at the abutment element side, an external thread, and the abutment element comprises a corresponding internal thread for interacting with said external thread.

11. A bearing arrangement for a driver's cab of a vehicle, the bearing arrangement comprising a cone bearing which, centrally, has a bearing sleeve which is fixable to the driver's cab and which extends through an opening of a cab support and which is of hollow form;

wherein the bearing sleeve is, at the outside, by way of an elastic damping element connected thereto, connected to a concentrically arranged support element;

wherein the support element is fixable to the cab support at a cab side by way of connecting elements, and wherein the support element comprises an abutment element which is arranged on an end, averted from the driver's cab, of the bearing sleeve and which serves for limiting a movement of the damping element in an axial direction (A);

wherein an installation element is arranged on a side, facing toward the abutment element, of the cab support, which installation element is, by way of the connecting elements, fastened to the cab support concentrically with respect to the bearing sleeve;

wherein the bearing arrangement is, in a mounted state, arranged between the driver's cab and a cab support of the vehicle; and, wherein the abutment element comprises a passage bore with an internal thread for screw connection to an external thread of a cab bolt.

12. The bearing arrangement as claimed in claim 11, wherein the installation element is supported, within an opening of the cab support, on the support element.

13. The bearing arrangement as claimed in claim 11, wherein the installation element fixed to the cab support is in linear and/or areal contact with the cab support.

14. The bearing arrangement as claimed in claim 11, wherein the installation element comprises a shoulder which extends at least partially into an opening of the cab support and which serves in particular for making contact, radially at the outside, with the cab support within the opening.

15. The bearing arrangement as claimed in claim 11, wherein the bearing sleeve comprises, at the abutment element side, an external thread for interacting with the internal thread of the abutment element.

\* \* \* \* \*